(12) United States Patent
Jung et al.

(10) Patent No.: US 9,357,089 B2
(45) Date of Patent: May 31, 2016

(54) IMAGE FORMING APPARATUS INCLUDING A ROTATABLE OPERATION PANEL

(71) Applicant: SAMSUNG ELECTRONICS CO., LTD., Suwon-si, Gyeonggi-do (KR)

(72) Inventors: Eun-tae Jung, Hwaseong-si (KR); Yu-jin Oh, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/593,425

(22) Filed: Jan. 9, 2015

(65) Prior Publication Data

US 2016/0021267 A1    Jan. 21, 2016

(30) Foreign Application Priority Data

Jul. 21, 2014    (KR) .................. 10-2014-0092157

(51) Int. Cl.
*G03G 15/00*    (2006.01)
*H04N 1/00*    (2006.01)

(52) U.S. Cl.
CPC ................. *H04N 1/00496* (2013.01)

(58) Field of Classification Search
CPC ........ G03G 15/5016; H04N 1/00496; H04N 1/0411
USPC .......................................... 399/81
See application file for complete search history.

(56) References Cited

U.S. PATENT DOCUMENTS 7,787,795 B2 *    8/2010    Sugawara et al. ............... 399/81
2013/0341963 A1    12/2013    Hirano et al.

* cited by examiner

*Primary Examiner* — Hoang Ngo
(74) *Attorney, Agent, or Firm* — Staas & Halsey LLP

(57) ABSTRACT

An image forming apparatus includes a main body; an operation panel coupled to the main body to rotate between a storage position and a use position; a stopper positioned on the operation panel; a stopper support unit, located on a rotation trajectory of the stopper with interference, which has a blocking position to block a rotation of the operation panel to the use position and the storage position, and a non-blocking position to allow a rotation of the operation panel; an elastic member to generate an elastic force in a direction where the stopper support unit is located in the blocking position; and an operation member to rotate the stopper support unit to the non-blocking location.

13 Claims, 16 Drawing Sheets

IMAGE FORMING APPARATUS INCLUDING A ROTATABLE OPERATION PANEL

CROSS-REFERENCE TO RELATED APPLICATIONS

This application claims the priority benefit of Korean Patent Application No. 10-2014-0092157, filed on Jul. 21, 2014, in the Korean Intellectual Property Office, the disclosure of which is incorporated herein in its entirety by reference.

BACKGROUND

1. Field

One or more embodiments relate to an image forming apparatus including a rotatable operation panel, and more particularly, to an installation configuration of the operation panel to operate the image forming apparatus including a digital multi-function printer.

2. Description of the Related Art

According to the developments in digital printing technology, a digital multi-function printer is widely used where various functions such as printing, scanning and copying are incorporated into one apparatus. Such an apparatus is referred to as a digital multi-function printer or an image forming apparatus and has become widely used recently. In the image forming apparatus, a scanning unit for scanning a document is arranged on a top portion and a document moving system is arranged on a top portion of the scanning unit, and thus, an operation panel for operating the image forming apparatus is installed in an area laterally protruding from the top portion of the image forming apparatus. Accordingly, a bottom area occupied by the image forming apparatus increases in comparison with a conventional image forming apparatus, thereby increasing the total installation area of the image forming apparatus.

In addition, the operation panel may be structurally unstable due to installation in the area laterally protruding from the top portion of the image forming apparatus and lack of a special supporting unit for supporting a bottom portion thereof. For example, when a user presses operation buttons installed on the operation panel, a downward compression force is continuously applied onto the operation panel, and the durability thereof may be degraded.

Also, since the operation panel laterally protrudes, when the image forming apparatus is packed, the size of a packing box becomes larger and an unnecessary space may be produced inside the packing box, and thus, a damage may happen at a connection unit between the operation panel and the main body due to an impact generated during transportation or dropping of the packing box.

SUMMARY

In an aspect of one or more embodiments, there is provided an image forming apparatus which may have an operation panel and a connecting unit thereof undamaged and stably maintained during usage as well as transportation processes, while the installation area for the image forming apparatus to occupy may be minimized.

In an aspect of one or more embodiments, there is provided an image forming apparatus, with a paper discharge unit arranged between a scanning unit and a printing unit, where the structure around the paper discharge unit may be more stably supported.

In an aspect of one or more embodiments, there is provided an image forming apparatus which may include a main body; the operation panel coupled to the main body to rotate between a storage position and a use position; a stopper positioned on the operation panel; a stopper support unit, located on a rotation trajectory of the stopper with interference, which has a block position to block a rotation of the operation panel to the use position and the storage position, and a non-blocking position to allow a rotation of the operation panel; an elastic member to generate an elastic force in a direction where the stopper support unit is located in the block position; and an operation member to rotate the stopper support unit to the non-blocking position.

When the operation panel is located in the use position, the stopper is blocked by the stopper support unit and the operation panel may be maintained in the use position.

The stopper may include a first side which interferes with the stopper support unit when the operation panel rotates from the storage position to the use position, and a second side which interferes with the stopper support unit when the operation panel rotates from the use position to the storage position.

When the operation panel is located in the use position, the second side is blocked by the stopper support unit and the operation panel may be maintained in the use position.

The first side may have a configuration to push the stopper support unit and rotate the stopper support unit to the non-blocking position when the operation panel rotates from the storage position to the use position.

In an aspect of one or more embodiments, there is provided an image forming apparatus which may further include a rotation resistance unit generating a rotation resistance force against a rotation of the operation panel.

The operation panel may further include a paper discharge position rotated beyond the use position from the storage position.

In an aspect of one or more embodiments, there is provided an image forming apparatus which may further include an ensconcing unit storing the operation panel in the storage position.

The main body may include a printing unit printing images onto a paper, a scanning unit reading images from a document, and a paper discharge unit discharging a printed paper.

The scanning unit may be arranged on a top portion of the printing unit, and the paper discharge unit may be arranged between the printing unit and the scanning unit.

In the use position, a first space between a bottom portion of the operation panel and a loading side of the paper discharge unit may be higher than about 60 mm in length.

The operation panel may further include a paper discharge position forming a second space larger than the first space between the bottom portion of the operation panel and the loading side.

In an aspect of one or more embodiments, there is provided an image forming apparatus which may further include a rotation resistance unit to generate (to provide) a rotation resistance force against the operation panel.

The operation panel may be maintained at an arbitrary position between the use position and the paper discharge position due to the rotation resistance force of the rotation resistance unit.

In an aspect of one or more embodiments, there is provided an image forming apparatus including a main body; an operation panel coupled to the main body to rotate between a storage position and a use position; a stopper positioned on the operation panel; a rotation member coupled to the main body; a stopper support unit, installed on the rotation member and located on a rotation trajectory of the stopper with interference, which has a blocking position to block a rotation of the operation panel to the use position and to the storage position, and a non-blocking position to allow a rotation of the operation panel; an elastic member to generate an elastic force in a direction where the stopper support unit is located in the blocking position; and an operation member to rotate the stopper support unit to the non-blocking position, wherein the operation member comprises: a press unit exposed to outside of the main body for a user to press; an extension unit which extends toward the rotation member from the press unit; and a hook unit configured to be coupled to the main body to prevent separation of the operation member from the main body.

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION

Figure 1:
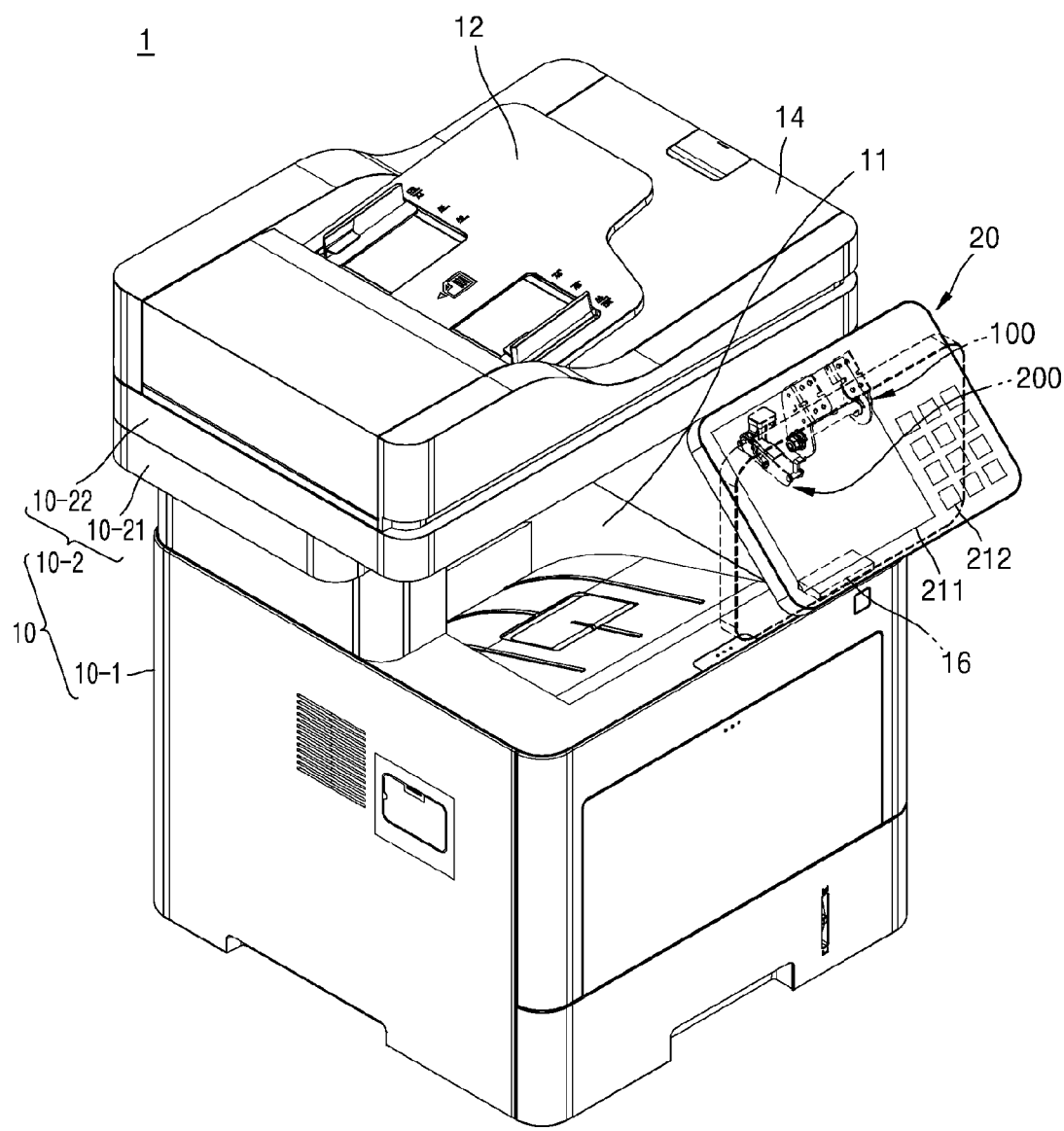
FIG. 1 is a perspective view of an image forming apparatus including a rotatable operation panel according to an embodiment.

Reference will now be made in detail to embodiments, examples of which are illustrated in the accompanying drawings, wherein like reference numerals refer to like elements throughout. Embodiments may have different aspects and should not be construed as being limited to the descriptions set forth herein. Accordingly, embodiments are merely described below, by referring to the figures, to explain aspects of the present disclosure.

FIG. 1 is a perspective view of an image forming apparatus 1 according to an embodiment.

Referring to FIG. 1, the image forming apparatus 1 may include a main body 10 and an operation panel 20 as a user interface.

The main body 10 may include a printing unit 10-1 printing images onto a paper, and a paper discharge unit 11 where papers discharged from the printing unit 10-1 is loaded. The main body 10 may further include a scanning unit 10-2 reading images from a document. The scanning unit 10-2 may be located at a top portion of the printing unit 10-1, and the paper discharge unit 11 may be located between the scanning unit 10-2 and the printing unit 10-1.

The printing unit 10-1 may print images onto a paper by using various well-known printing methods such as an electro-photographic method, an ink-jet method, and a thermal imprint method.

After a document is located in a fixed position, the scanning unit 10-2 may read images from the document by using various reading methods such as a flatbed method wherein a reading member (not illustrated) such as contact-type image sensor (CIS) and charge coupled device (CCD) reads images while moving, a document feed method wherein a reading member is fixed while the document moves, and a mixed method. The scanning unit 10-2 according to an embodiment may use the mixed method. For reading in the flatbed method, the upper unit 10-22 may be either open or closed with respect to the lower unit 10-21. For reading in the document feed method, an automatic document feed unit (not illustrated) feeding a plurality of documents to a reading area one at a time, where the reading member (not illustrated) is installed, may be arranged in the upper unit 10-22. For example, a plurality of documents laid in a document supply tray 12 may be drawn one at a time, pass through the reading area and be discharged to a document discharge tray 14.

The operation panel 20 may include a display screen 211 to display an operation status of the image forming apparatus 1 and a plurality of operation buttons 212 for a user to enter signals. The operation panel 20 may be rotatably connected to the main body 10 and may rotate between a storage position illustrated as dotted lines in FIG. 1 and a use position illustrated as solid lines in FIG. 1.

According to an embodiment, the operation panel 20 may rotate with respect to the front side of the main body 10 using a hinge connection. However, embodiments are not limited hereto and the operation panel 20 may be located either on the left side or the right side of the main body 10 as well as the front side of the main body 10.

The operation panel 20 may be supported by a first support member 100 to rotate with respect to the main body 10. A second support member 200 is arranged onto the main body 10 and may selectively permit a rotation of the operation panel 20 depending on a rotation angle and/or a rotation direction of the operation panel 20 with respect to the main body 10. For example, the second support member 200 may permit a rotation of the operation panel 20 from the storage position to the use position, and selectively permit a rotation from the use position to the storage position. The second support member 200 may maintain the operation panel 20 in the use position, and selectively permit a rotation from the use position to the storage position according to a user's operation.

Figure 2A:
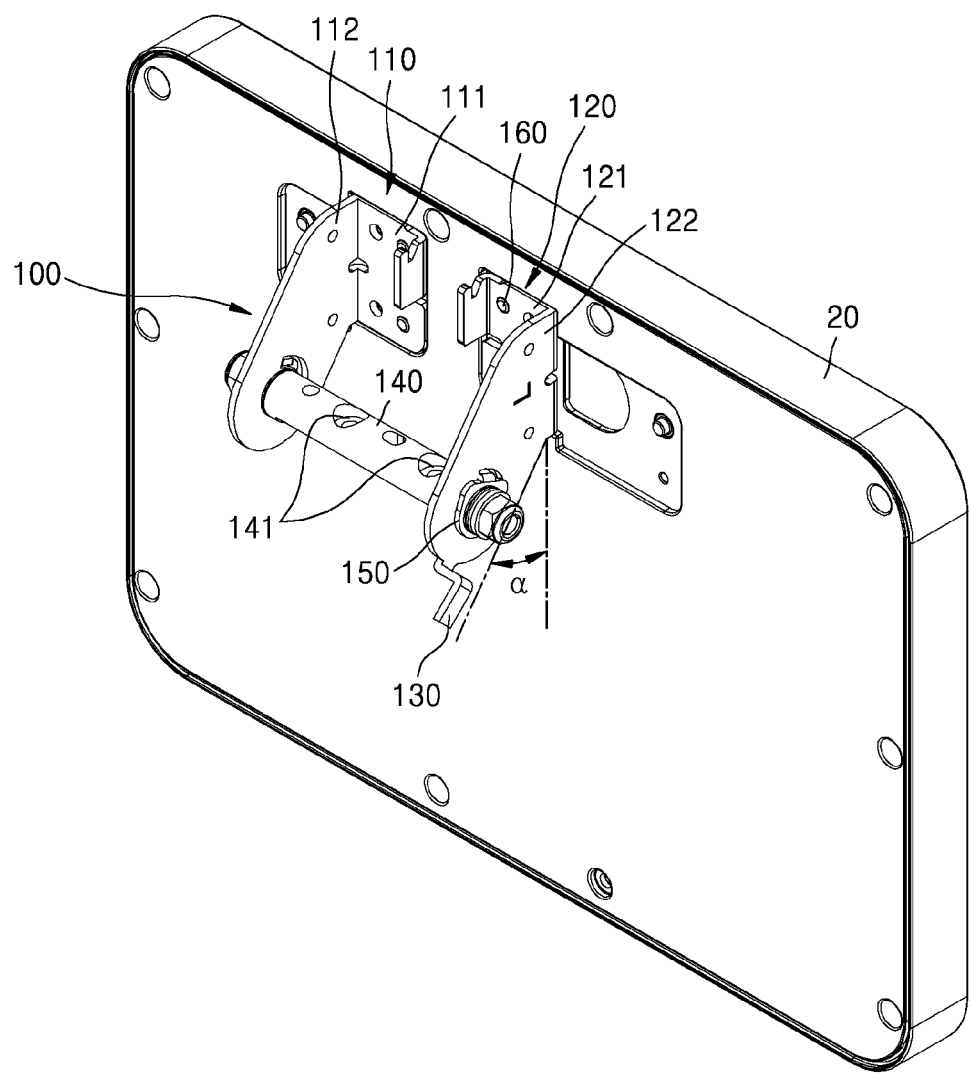
FIG. 2A is a perspective view of a first support member according to an embodiment.
Figure 2B:
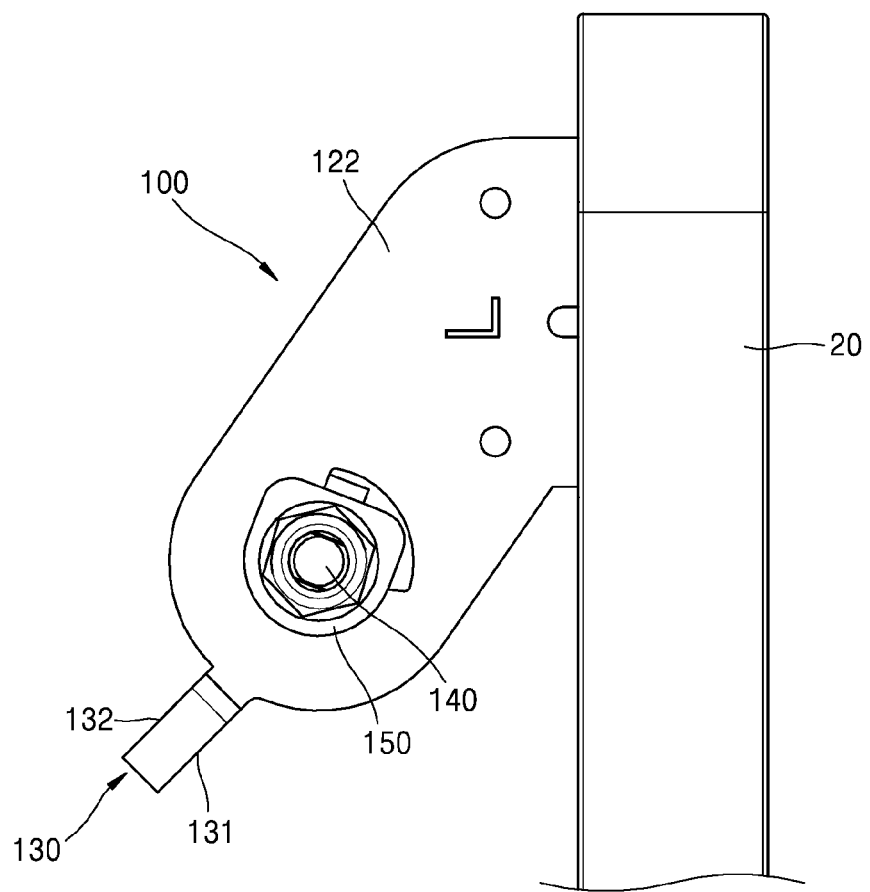
FIG. 2B is a side view of the first support member illustrated in FIG. 2A according to an embodiment.

FIG. 2A is a perspective view of the first support member 100 according to an embodiment, and FIG. 2B is a side view of the first support member 100 illustrated in FIG. 2A according to an embodiment.

Referring to FIG. 2A, the first support member 100 may include a connecting bar 140 and a pair of brackets 110, 120 rotatable with respect to the connecting bar 140. The connecting bar 140 may be connected to the main body 10, which is not illustrated. A joining hole 141 may be formed in the connecting bar 140 for connection with the main body 10. For example, the main body 10 and the connecting bar 140 may be connected by a fastening member such as a screw fastened in the joining hole 141.

The pair of brackets 110, 120 may include a fixed unit 111, 121 fixed to the operation panel 20 and a rotation unit 112, 122 which is extended from the fixed unit 111, 121 and connected to both ends of the connecting bar 140. Between both ends of the connecting bar 140 and the rotation unit 112, 122, a rotation resistance unit 150 may be arranged to provide a rotation resistance force against a rotation of the rotation unit 112, 122 with respect to the connecting bar 140. For example, the rotation resistance unit 150 may include a spring which applies an elastic force to both ends of the connecting bar 140 and the rotation unit 112, 122 in an axial direction of the connecting bar 140. The spring may include, for example, a spring washer.

Based on the above configuration, the operation panel 20 may rotate with respect to the main body 10 and is supported by the first support member 100. Also, due to the rotation resistance unit 150, the operation panel 20 may rotate with respect to the main body 10 only when a force larger than a resistance force of the rotation resistance unit 150 is applied thereto.

The first support member 100 may further include a stopper 130. The stopper 130 may selectively permit a rotation of the operation panel 20 with respect to the main body 10, due to an interaction with a second support member 200. Also, the stopper 130 may maintain the operation panel 20 in the use position due to interaction with a second support member 200.

Referring to FIGS. 2A and 2B, the stopper 130 may be extended from the rotation unit 122 of the bracket 120. For example, the stopper 130 forms a first angle α with respect to the operation panel 20. According to an embodiment, the stopper 130 may be an integral part of the bracket 120. However, embodiments are not limited thereto and the stopper 130 may be connected to the bracket 120. Also, the stopper 130 may be directly connected to the operation panel 20. Also, the stopper 130 may be an integral part of the back side of the operation panel 20. According to an embodiment, only one stopper 130 is illustrated but two or more stoppers 130 may be used. The two or more stoppers 130 may be an integral part of the bracket 110, 120, be connected to the bracket 110, 120, be directly connected to the operation panel 20, or be an integral part of the back side of the operation panel 20.

Figure 3A:
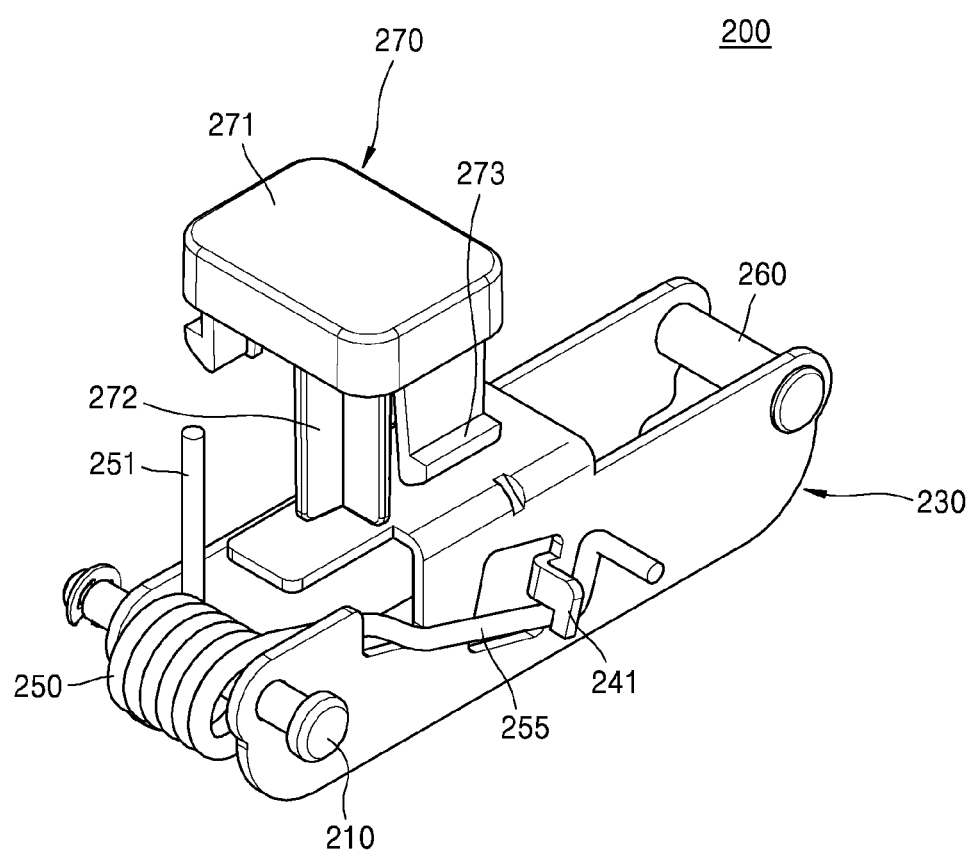
FIG. 3A is a perspective view of a second support member according to an embodiment.
Figure 3B:
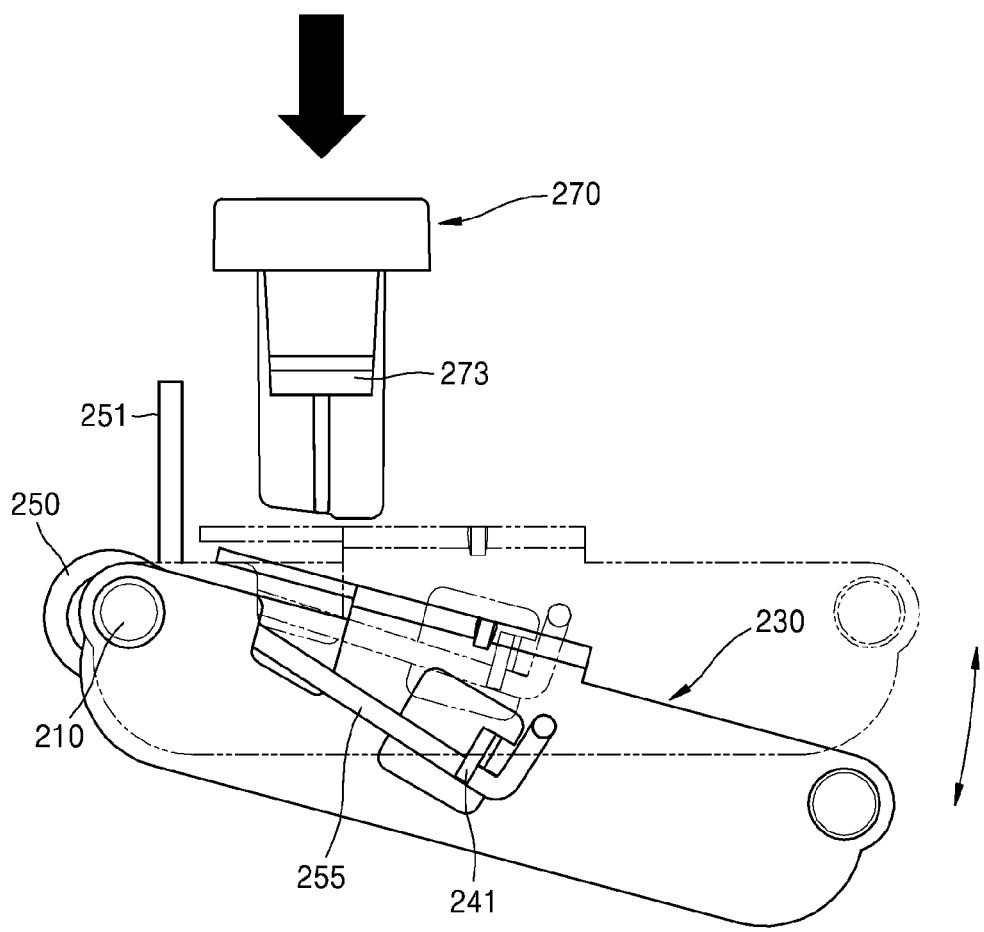
FIG. 3B is a side view of the second support member illustrated in FIG. 3A according to an embodiment.

FIG. 3A is a perspective view of the second support member 200 according to an embodiment, and FIG. 3B is a side view of the second support member 200 illustrated in FIG. 3A according to an embodiment.

Referring to FIGS. 3A and 3B, the second support member 200 may include a stopper support unit 260, an operation member 270 to rotate the stopper support unit 260, and an elastic member 250 applying an elastic force to the stopper support unit 260 in a direction opposite to a rotation direction of the operation member 270.

The stopper support unit 260 rotates to a blocking position (indicated by dotted lines in FIG. 3B) where the stopper support unit 260, in interference with the stopper 130, blocks a rotation of the operation panel 20 from the use position to the storage position, and also rotates to a non-blocking position (indicated by solid lines in FIG. 3B) where the stopper support unit 260, away from a rotation trajectory of the stopper 130, allows a rotation of the operation panel 20. The elastic member 250 generates an elastic force against the stopper support unit 260 in a direction returning to the blocking position.

For example, a rotation axis 210 and a rotation member 230, which may rotate with respect to the rotation axis 210, may be arranged on the main body 10 and the stopper support unit 260 may be installed on the rotation member 230. The stopper support unit 260, for example, may be connected to the rotation member 230 by, for example, caulking. Even not illustrated, the stopper support unit 260 may be an integral part of the rotation member 230.

The operation member 270 may be, for example, a button which a user may press. Referring to FIG. 3A, the operation member 270 may include a press unit 271 exposed to an outside of the main body 10 for a user to press, and an extension unit 272 extended toward the rotation member 230 from the press unit. A hook unit 273 is caught in the main body 10 so that the operation member 270 may not separate from the main body 10.

The elastic member 250 may be, for example, a twisted coil spring with an end 251 supported by the main body 10 and other end 255 caught in a catch unit 241 arranged on the rotation member 230.

As illustrated in FIG. 3A, in a state where the operation member 270 is un-pressed, the stopper support unit 260 is located in the blocking position due to an elastic force of the elastic member 250. The extension unit 272 of the operation member 270 is in contact with the rotation member 230.

Referring to FIG. 3B, when a user applies an external force downward onto the press unit 271, the rotation member 230 rotates in the opposite (clockwise) direction of an elastic force of the elastic member 250, and the stopper support unit 260 is located in the non-blocking position. When the external force is removed, the rotation member 230 rotates in the counter-clockwise direction due to the elastic force of the elastic member 250, and the stopper support unit 260 returns to the blocking position. The operation member 270 returns to the original position due to pushing of the rotation member 230 rotating in the counter-clockwise direction. The elastic member 250 provides a resetting force for the operation member 270 to return to the original position. The rotation in the counter-clockwise direction of the rotation member 230 may be limited by the hook unit 273. In other words, when the stopper support unit 260 is located in the blocking position, the hook unit 273 is supported by the main body 10 and the rotation member 230 does not further rotate in the counter-clockwise direction. Thus, the stopper support unit 260 may be maintained in the blocking position; however, embodiments are not limited hereto. For example, when the stopper support unit 260 is located in the blocking position, either the stopper support unit 260 or the rotation member 230 comes in contact with a rotation limiting unit (not illustrated) arranged in the main body 10 and the rotation in the counter-clockwise direction may be limited.

Referring to FIG. 2B again, the stopper 130 may include a first side 131 which is caught in the stopper support unit 260 when the operation panel 20 rotates from the storage position to the use position or in the counter-clockwise direction, and a second side 132 which is caught in the stopper support unit 260 when the operation panel 20 rotates from the use position to the storage position or in the clockwise direction.

Figure 4A:
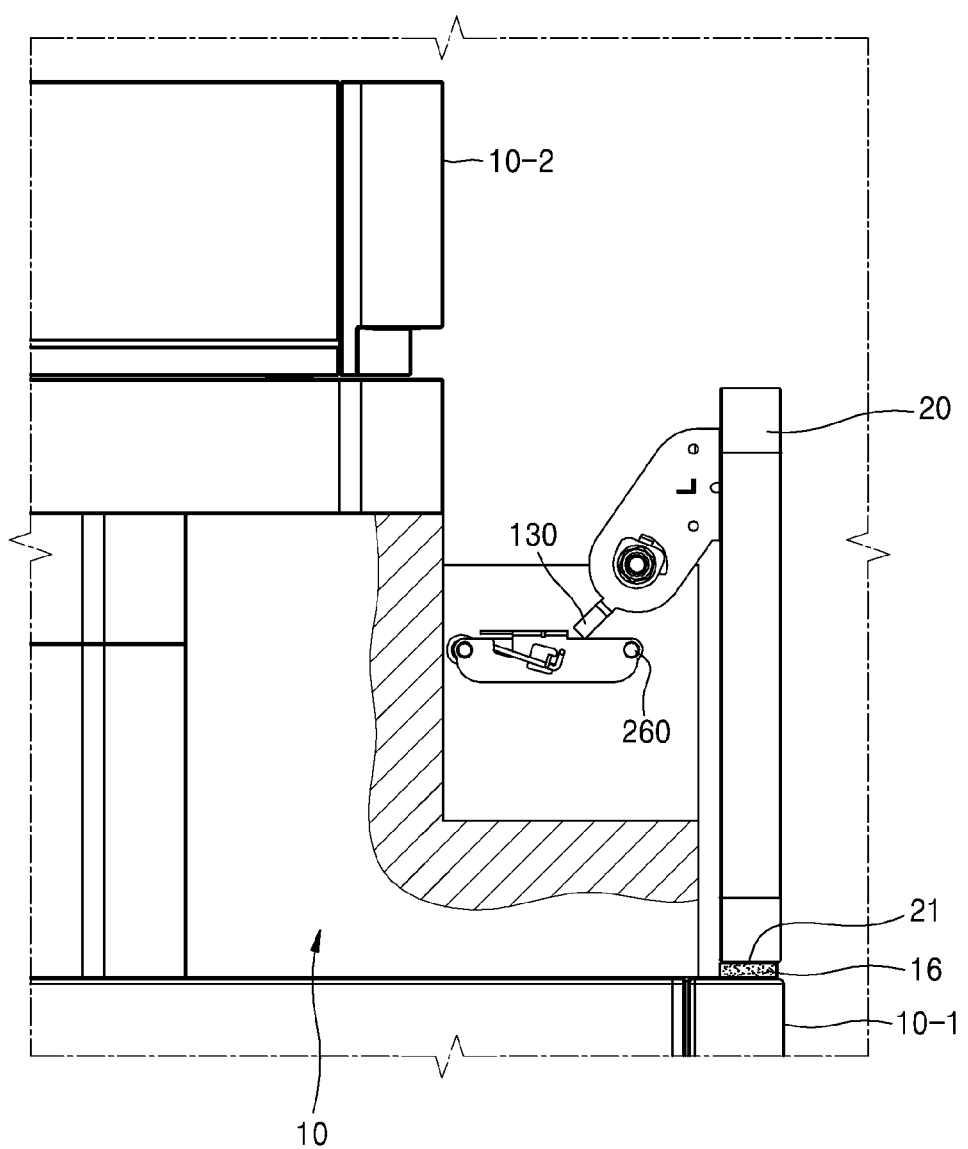
FIG. 4A is a partial side view of the image forming apparatus according to an embodiment, illustrating the operation panel in the storage position.
Figure 4B:
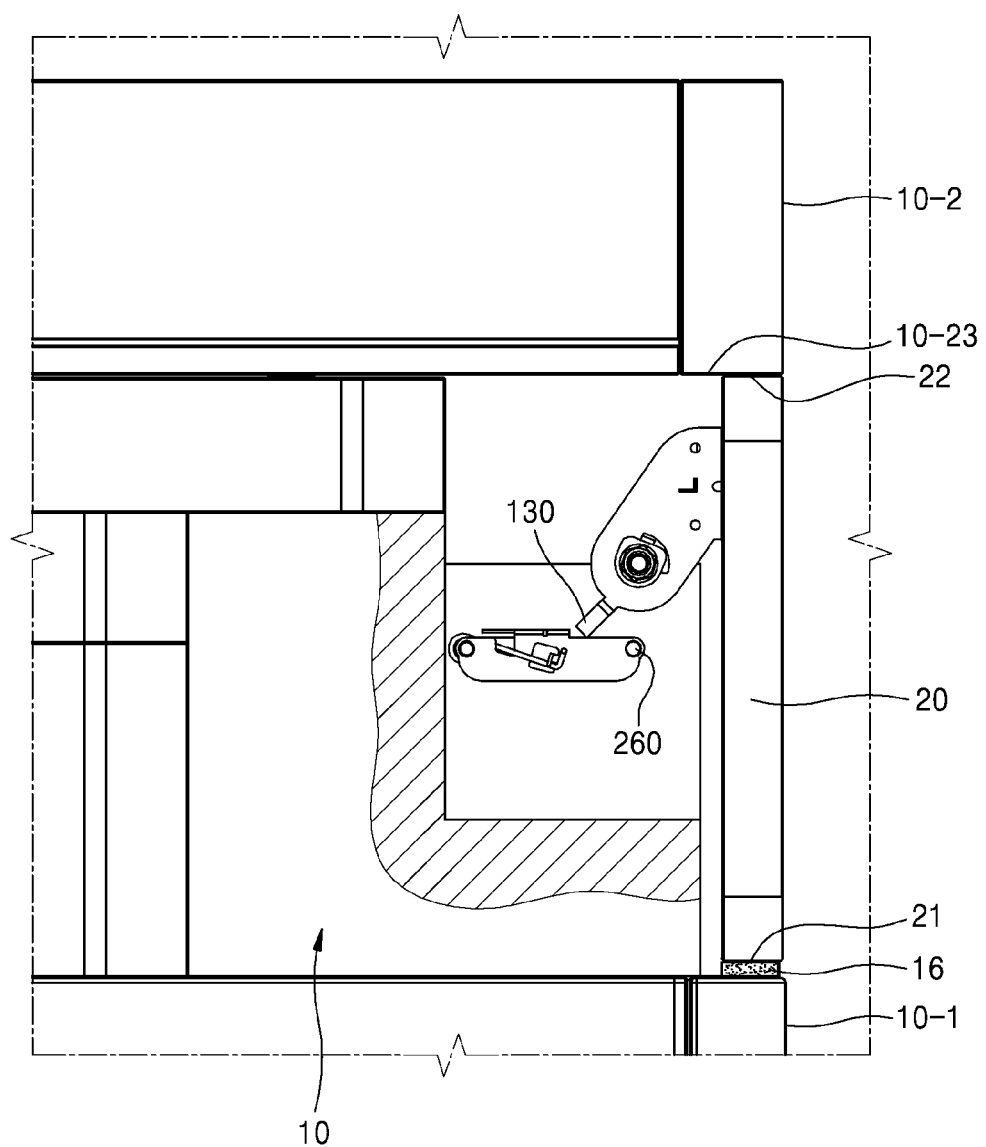
FIG. 4B is a partial side view of the image forming apparatus according to an embodiment, illustrating the operation panel in the storage position.

FIG. 4A is a partial side view of the image forming apparatus 1 according to an embodiment and shows a state where the operation panel 20 is located in the storage position. FIG. 4B is a partial side view of the image forming apparatus 1 according to an embodiment and shows a state where the operation panel 20 is located in the storage position.

Referring to FIG. 4A, a storage state or the storage position where the rotation angle of the operation panel 20 with respect to the main body 10 is zero is illustrated. The stopper 130 is separated from the stopper support unit 260. In the storage state, the protruding area of the operation panel 20 with respect to the side area of the main body 10 may be minimized. Accordingly, the total shape of the image forming apparatus 1 may become smaller so that transportation thereof may be easier and a size of a packaging box may be reduced. A bottom portion 21 of the operation panel 20 may be supported by an ensconcing unit 16 arranged in the main body 10, that is, in a printing unit 10-1. Accordingly, the operation panel 20 may be stably maintained in the storage state. Also, an impact applied to the first support member 100 during packaging and transportation of the image forming apparatus 1 may be distributed and a risk of damaging the first support member 100 may be reduced.

Referring to FIG. 4B, the scanning unit 10-2 is extended to a top portion 22 of the operation panel 20. In the storage state, the bottom portion 21 of the operation panel 20 is supported by the ensconcing unit 16 and the top portion 22 is supported by a bottom portion 10-23 of the scanning unit 10-2. Thus, in the storage state, not only the operation panel 20 may be stably maintained by the main body 10 but also the scanning unit 10-2 may be stably maintained by the printing unit 10-1 and the operation panel 20. Accordingly, an impact applied to the main body 10 during packaging or transportation of the image forming apparatus 1 is generally distributed to the main body 10 and the operation panel 20, and thus, a risk of damaging the main body 10 and the operation panel 20 due to the impact may be reduced. Also, according to an embodiment, in a configuration where the paper discharge unit 11 is located at a center area of the main body 10, that is, between the printing unit 10-1 and the scanning unit 10-2, the operation panel 20 may also support the scanning unit 10-2, and thus, structures around the paper discharge unit 11 may be prevented from being damaged during transportation of the image forming apparatus 1.

Figure 5A:
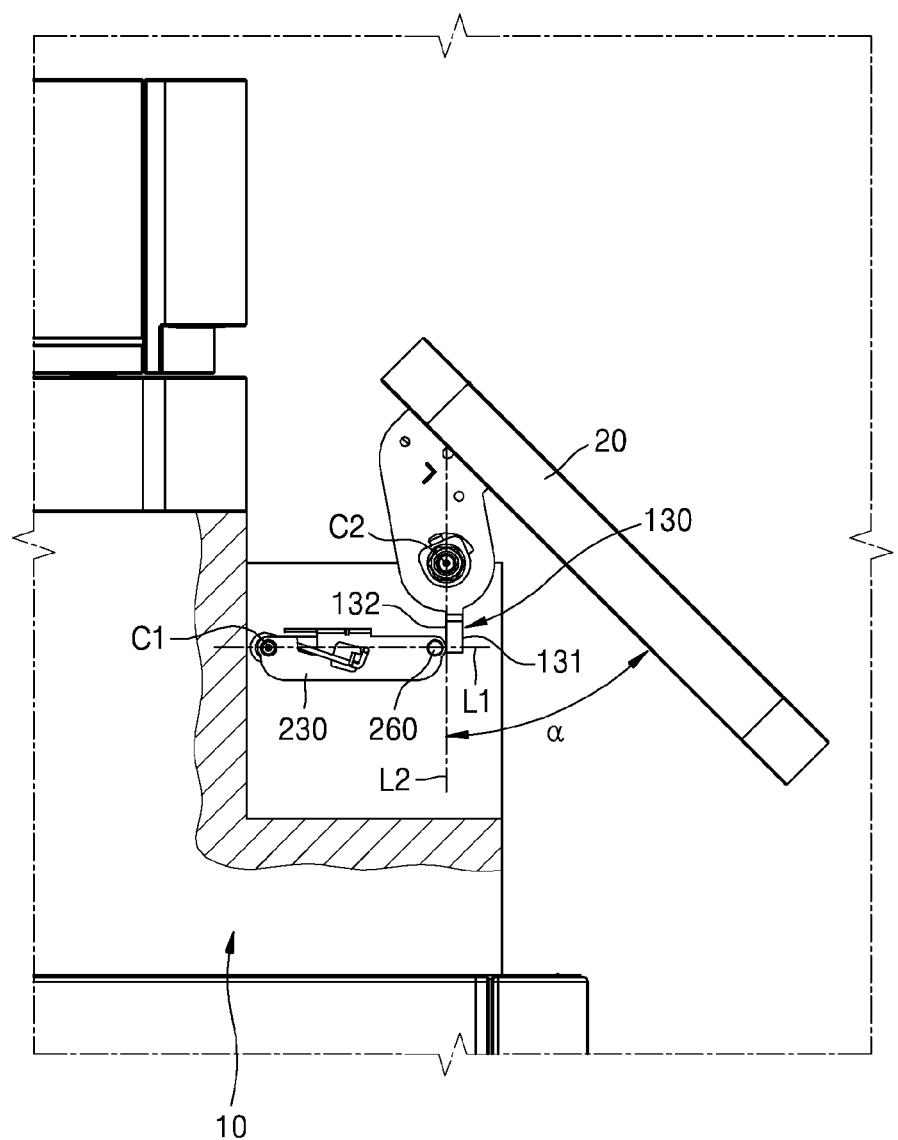
FIGS. 5A and 5B are a partial side view and a partial front view, respectively, illustrating the operation panel in the use position.
Figure 5B:
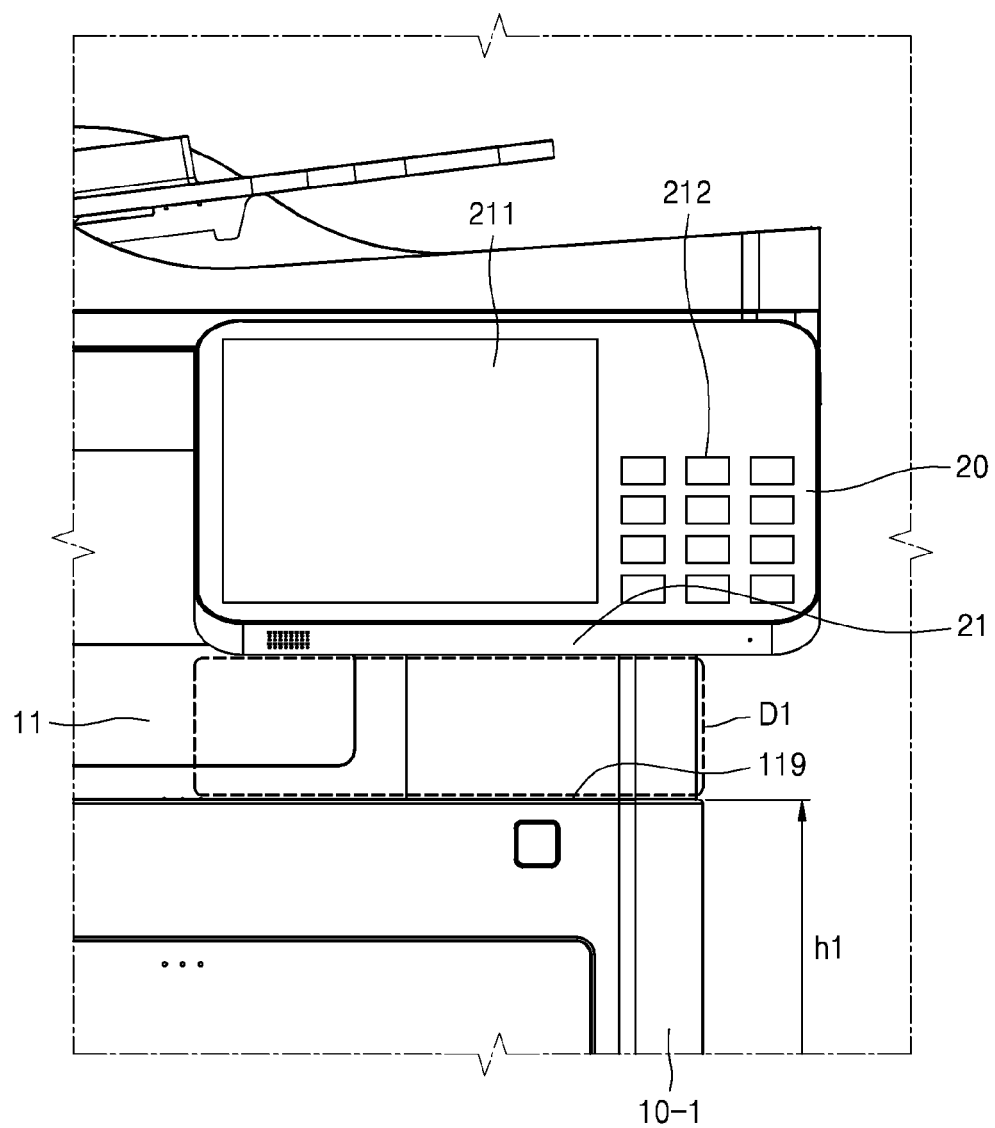

FIGS. 5A and 5B are, respectively, a partial side view and a partial front view of the image forming apparatus 1 illustrating a state where the operation panel 20 is located in the use position.

Referring to FIG. 5A, the use state or use position is illustrated, wherein the operation panel 20 is rotated by an angle, for example, of 45 degrees. In order to rotate the operation panel 20 from the storage position to the use position, the operation member 270 is pressed to rotate the stopper support unit 260 to rotate up to a non-blocking position where the stopper support unit 260 does not interfere with the stopper 130. Then, the operation panel 20 is rotated in counter-clockwise direction as shown in FIG. 5A. And then, since the first side 131 of the stopper 130 is not caught in the stopper support unit 260, the operation panel 20 may rotate from the storage position to the use position. When the force acting on the operation member 270 is removed, the stopper support unit 260 returns to the block position due to an elastic force of the elastic member 250. In this state, when the operation panel 20 rotates again in clockwise direction, the second side 132 of the stopper 230 is caught in the stopper support unit 260 located in the block position, and the operation panel 20 may not further rotate beyond the use position. Thus, the operation panel 20 may be maintained in the use position. Since the stopper 130 is supported by the stopper support unit 260, the operation panel 20 may be maintained in the use state despite an operation force applied onto the operation panel 20.

The use angle may be determined by the first angle, α, which is an angle formed by the stopper 130 with the operation panel 20, and a position of the stopper support unit 260. According to an embodiment, a case when the use angle is 45 degrees is explained. However, embodiments are not limited hereto. The first angle, α, which is the angle formed by the stopper 130 with the operation panel 20 and a position of the stopper support unit 260 may be properly determined according to a desired use angle.

In the use state, a line L1 connecting a rotation center C1 of the stopper support unit 260 or the rotation member 230 and the stopper support unit 260, and a line L2 connecting a rotation center C2 of the operation panel 20 and the stopper 130 may be perpendicular to each other. The second side 132 of the stopper 130 may be located on the line L2. When a user presses various operation buttons 212 arranged on the operation panel 20, the operation force applied to the operation panel 20 is transferred to the stopper support unit 260 through the stopper 130. When the direction of this force is not in parallel with the line L1, the rotation member 230 may rotate in the opposite direction of the elastic force of the elastic member 250. Then, the operation panel 20 may not be maintained in the use position and may rotate to the storage position. According to an embodiment, as the line L1 and the line L2 are perpendicular to each other, a component force perpendicular to the line L1 of the force applied to the stopper support unit 260 is almost zero. Hence, the stopper support unit 260 may be stably maintained in the blocking position, and the operation panel 20 also may be stably maintained in the use position.

Referring to FIG. 5B, the paper discharged from the printing unit 10-1 is loaded in the paper discharge unit 11. The paper load amount of the paper discharge unit 11 may be limited by the operation panel 20 located in the use position. For example, the paper load amount of the paper discharge unit 11 may be limited by a first space D1 between the bottom portion 21 of the operation panel 20 and a load side 119 of the paper discharge unit 11.

The first space D1 may be determined by the load amount of a paper supply cassette, not illustrated, supplying paper to the printing unit 10-1. Generally, the load amount of paper of the paper supply cassette is not more than about 500 sheets, and thus, the first space D1, for example, may be determined to carry about 500 sheets. To this end, the first space D1 may be, for example, higher than about 60 mm in length. A height h1 of the load side 119 of the paper discharge unit 11 may be determined by considering the first space D1 and a position of the lower portion 21 of the operation panel 20 located in the use position.

When printing is completed and paper loaded in the paper discharge unit 11 is drawn, a space accessible to the paper discharge unit 11 may be limited due to the operation panel 20 located in the use position. Also, the paper load amount of the paper discharge unit 11 may need to be increased for printing a large amount of paper. In order to easily draw printed paper from the paper discharge unit 11 or to increase the paper load amount of the paper discharge unit 11, the operation panel 20 may be located in a paper discharge position by rotating beyond the use position.

Figure 6A:
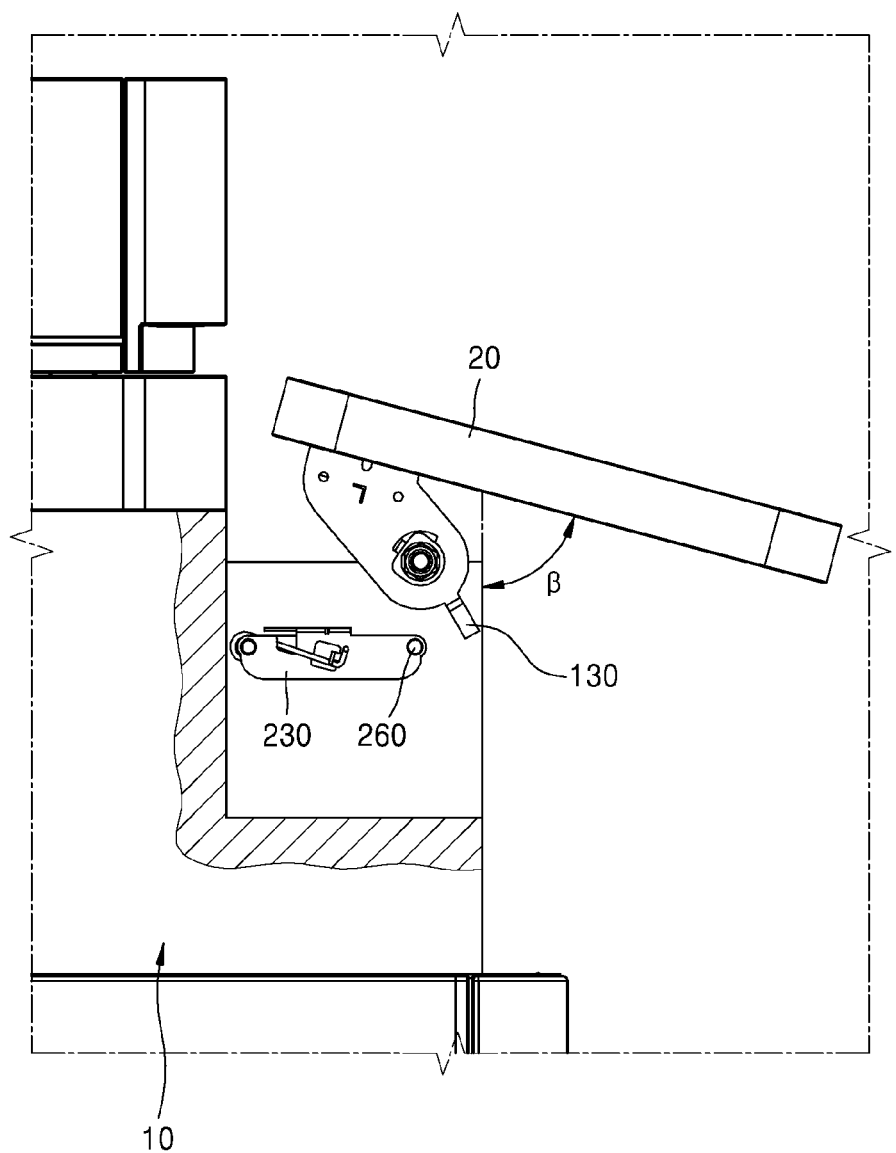
FIG. 6A is a partial side view of the image forming apparatus with the operation panel located in the paper discharge position.
Figure 6B:
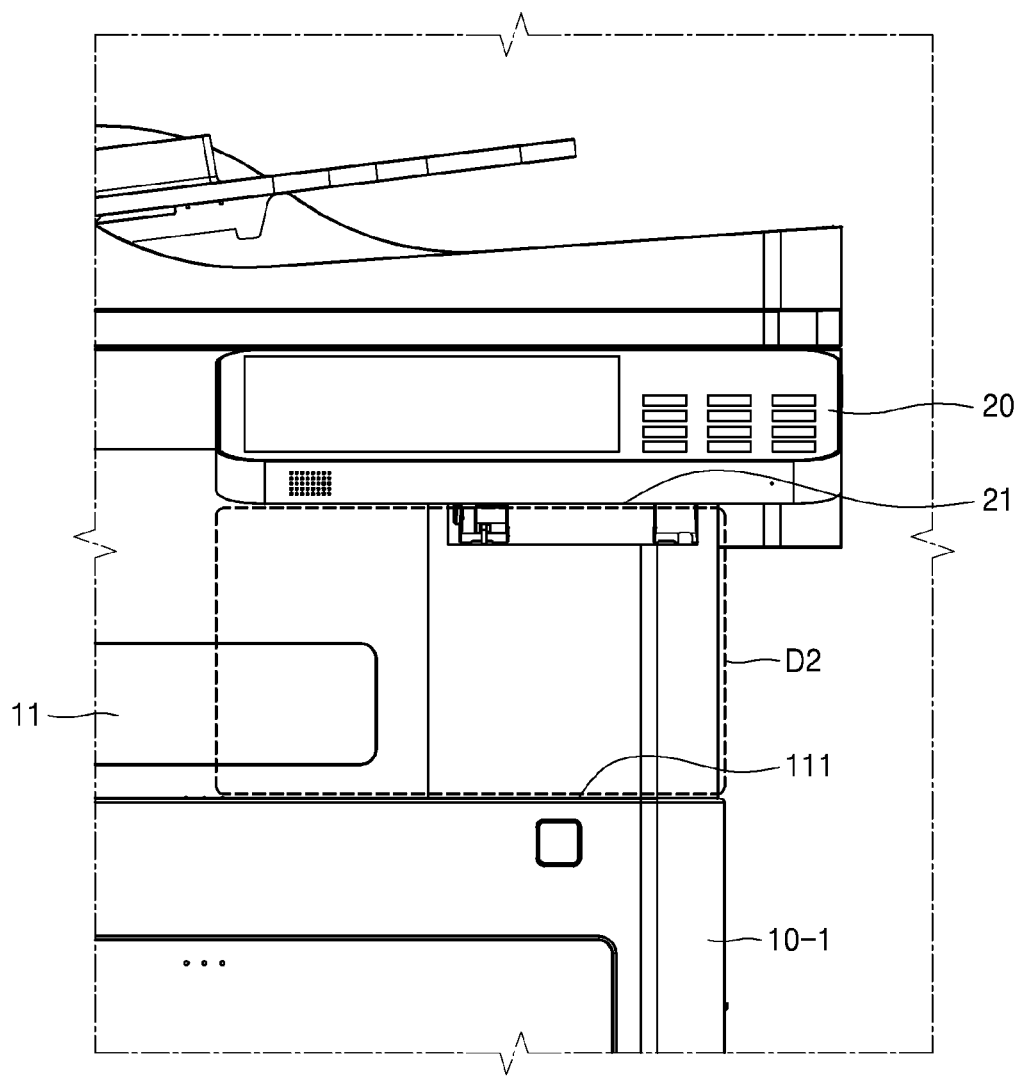
FIG. 6B is a partial front view of the image forming apparatus illustrated in FIG. 6A.

FIG. 6A is a partial side view of the image forming apparatus 1 when the operation panel 20 is located in the paper discharge position, and FIG. 6B is a partial front view of the image forming apparatus 1 illustrated in FIG. 6A.

Referring to FIG. 6A, the operation panel 20 may rotate counter-clockwise from the main body 10 up to a second angle β. The operation panel 20 may rotate up to the paper discharge position due to a user's operation or an external force. According to an embodiment, the operation panel 20 may rotate beyond the use position, for example, up to 75 degrees for user convenience, and in this state, the stopper 130 may not be supported by the stopper support unit 260.

Referring to FIG. 6B, when the operation panel 20 is located in the paper discharge position, a second space D2 where printed paper can be drawn or loaded may be formed between the operation panel 20 and the paper discharge unit 11. As the operation panel 20 is arranged to rotate by a maximum angle in a counter-clockwise direction from the side portion of the main body 10, the second space D2 which is larger than the first space D1 may be formed in the frontal direction of the paper discharge unit 11, between the load side 119 of the paper discharge unit 11 and the lower portion 21 of the operation panel 20. The operation panel 20 may be maintained in the paper discharge position by the rotation resistance unit 150. Also, the operation panel 20 may be maintained in an arbitrary position between the use position and the paper discharge position.

In order to rotate the operation panel 20 from the use position or the paper discharge position, the stopper support unit 260 may be rotated to the non-blocking position by pressing the operation member 270. Then, the stopper support unit 260 may be separated from the second side 132 of the stopper 130. And then, the operation panel 20 may be rotated clockwise to the storage position. When force acting on the operation member 270 is removed, the stopper support unit 260 may return to the blocking position due to an elastic force of the elastic member 250.

FIGS. 7A through 7E are partial side views of the image forming apparatus 1 showing states when the operation panel 20 rotates to the storage position, the use position, and the paper discharge position according to an embodiment.

When the operation panel 20 rotates from the storage position to the use position, a rotation of the operation panel 20 may be allowed without any operation of the operation member 270. To this end, when the operation panel 20 rotates from the storage position to the use position, the first side 131 of the stopper 130 may push the stopper support unit 230 located in the blocking position to rotate up to the non-blocking position. Accordingly, when the operation panel 20 rotates from the storage position to the use position, an operation of the operation member 270 is unnecessary, and thus, the user's convenience may be enhanced. For this purpose, the first side 131 of the stopper 130 may have a curved shape as illustrated in FIGS. 7A through 7E.

Figure 7A:
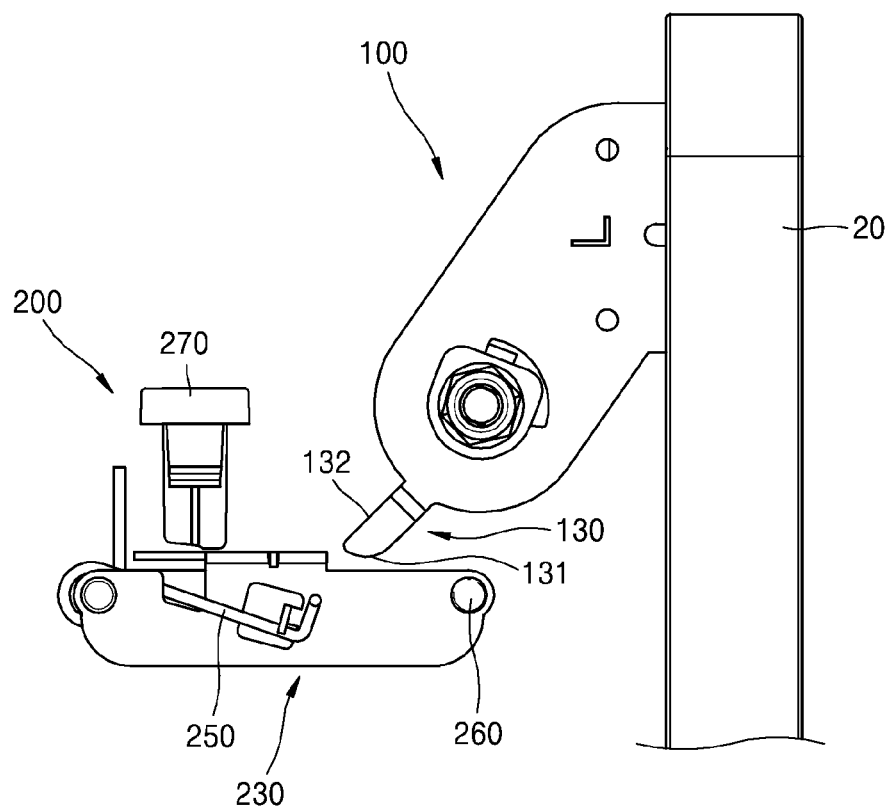
FIGS. 7A through 7E are partial side views according to other embodiments, illustrating states where the operation panel is rotated to the storage position, the use position, and the paper discharge position.

Referring to FIG. 7A, the stopper 130 and the stopper support unit 260 are separated during a storage state of the operation panel 20. The operation panel 20 may rotate in a counter-clockwise direction when an external force is applied to the operation panel 20 by a user or an external source.

Figure 7B:
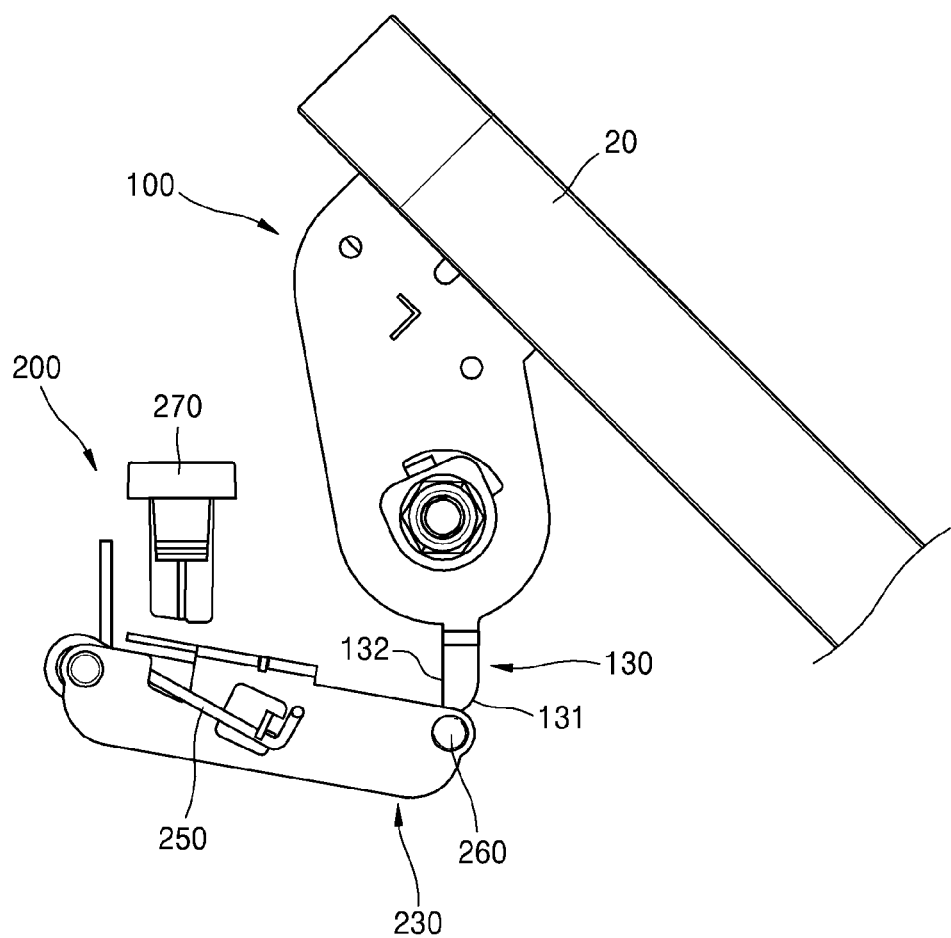

Referring to FIG. 7B, as the operation panel 20 approaches to the use position, the first side 131 of the stopper 130 comes in contact with the stopper support unit 260. Since the first side 131 of the stopper 130 has a curved shape, as the operation panel 20 continues to rotate in the counter-clockwise direction, the stopper support unit 260 is pushed by the first side 131, rotates in a direction opposite to that of an elastic force of the elastic member 250, and is located in the non-blocking position allowing a rotation of the operation panel 20.

Figure 7C:
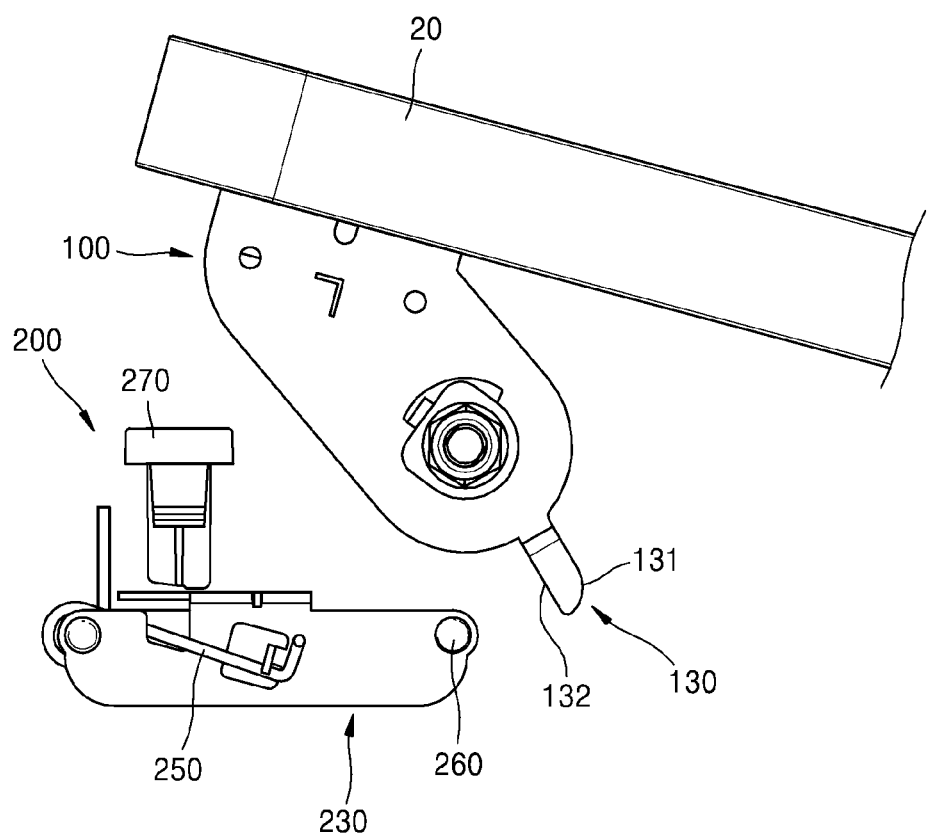

When the second side 132 of the stopper 130 and the stopper support unit 260 separate from each other, the stopper support unit 260 may return to the blocking position as illustrated in FIG. 7C. When necessary, a user may further rotate the operation panel 20 beyond the use position. For example, when a large amount of paper needs to be discharged to the paper discharge unit 11, the operation panel 20 may be rotated up to the paper discharge position or an arbitrary position between the use position and the paper discharge position.

Figure 7D:
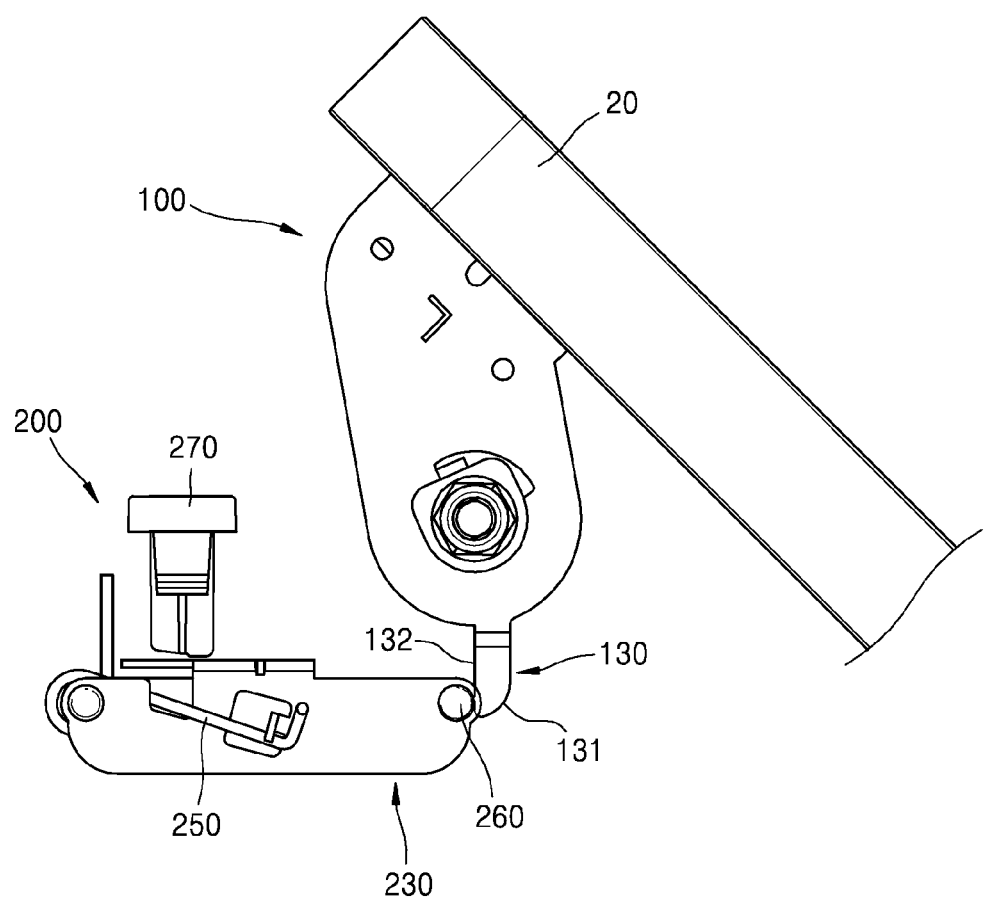

In order for the operation panel 20 to be located in the use position, the operation panel 20 may be rotated clockwise again. Then, as illustrated in FIG. 7D, the second side 132 of the stopper 130 comes in contact with the stopper support unit 260 located in the blocking position. Accordingly, the operation panel 20 does not rotate in a clockwise direction anymore and be maintained in the use position.

Figure 7E:
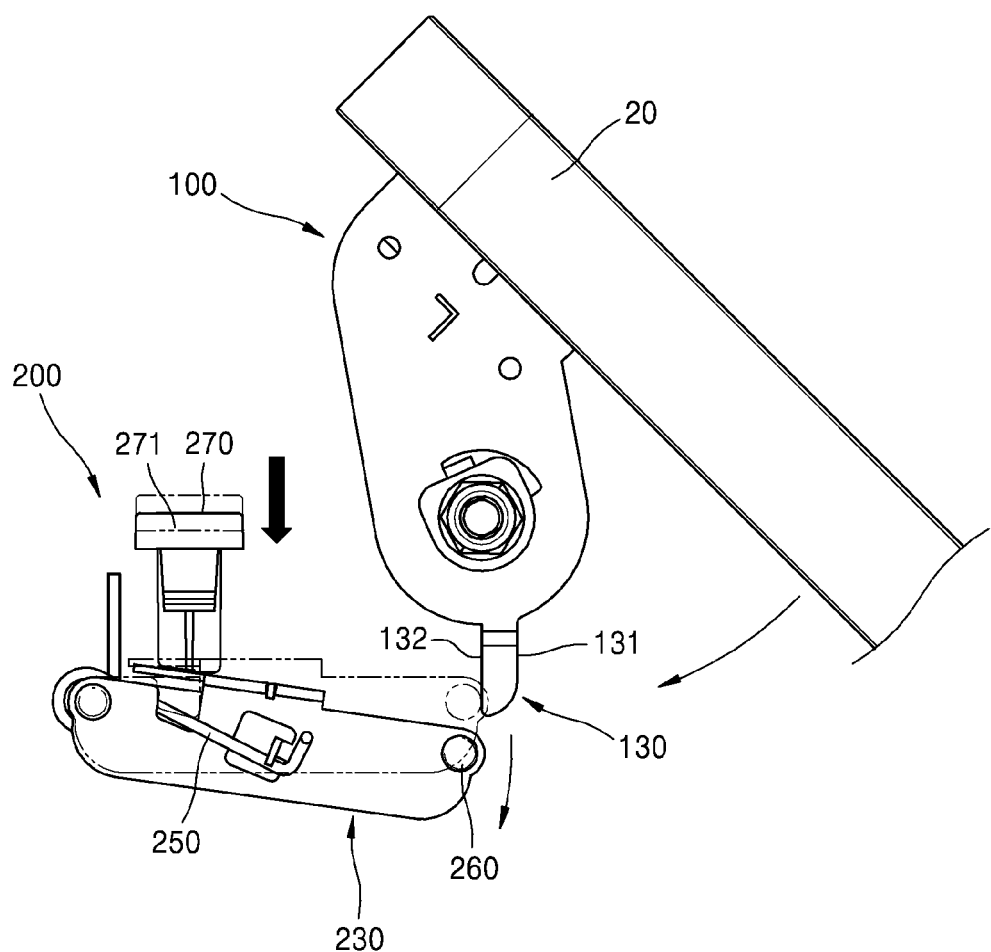

In order for the operation panel 20 to rotate again to the storage position, the operation member 270 may be pressed as illustrated in FIG. 7E. Thus, the rotation member 230 rotates in a direction opposite to that of an elastic force of the elastic member 250 and the stopper support unit 260 separates from the second side 132 of the stopper 130 to be located in the non-blocking position illustrated as solid lines. In this state, the operation panel 20 may be rotated to the storage position. When a force acting on the operation member 270 is removed, the stopper support unit 260 returns to the blocking position, illustrated as dotted lines in FIG. 7E, due to an elastic force of the elastic member 250.

A case when the first side 131 of the stopper 130 has a curved shape has been described in an embodiment above. However, embodiments are not limited hereto and the first side 131 of the stopper 130 may have an inclined shape. The first side 131 of the stopper 130 may have any of various shapes as long as the operation panel 20 may rotate from the storage position to the use position and the stopper support unit 260 located in the blocking position is pushed for the operation panel 20 to rotate from the non-blocking position.

As described above, according to the one or more of embodiments, when it is necessary to transport the image forming apparatus 1, the operation panel may be rotated to be stored in the main body of the image forming apparatus 1. Thus, a volume occupied by the image forming apparatus 1 during transportation may be minimized and a packing box with a reduced volume may be used so that the transportation cost as well as the amount of the packing box material may be reduced. Also, since the operation panel 20 on the ensconcing unit may stably support the structure around the page-out unit, the risk of damaging the image forming apparatus during transportation may be reduced.

In addition, since the operation panel is supported by the support unit in the use position where the operation panel is set in an upright position, the structural stability of the image forming apparatus 1 may be secured, and thus, the durability of the image forming apparatus 1 may be increased.

It should be understood that the exemplary embodiments described therein should be considered in a descriptive sense only and not for purposes of limitation. Descriptions of features or aspects within each embodiment should typically be considered as available for other similar features or aspects in other embodiments.

In one or more embodiments, when a range is described, individual values that belong to the range are included in the present specification, (unless a contrary description exists), which is equivalent to describing each individual value composing the range above in the detailed explanation of embodiments. Also, use of all examples or exemplary terms such as "etc." is simply to explain one or more embodiments in detail, and unless limited by the claims, the range is not limited by the examples or exemplary terms above.

Although a few embodiments have been shown and described, it would be appreciated by those skilled in the art that changes may be made in these embodiments without departing from the principles and spirit of the disclosure, the scope of which is defined in the claims and their equivalents.

What is claimed is:
1. An image forming apparatus comprising:
a main body;
an operation panel coupled to the main body to rotate between a storage position and a use position;
a stopper positioned on the operation panel;

a stopper support unit, located on a rotation trajectory of the stopper with interference, which has a blocking position to block a rotation of the operation panel to the use position and to the storage position, and a non-blocking position to allow a rotation of the operation panel;

an elastic member to generate an elastic force in a direction where the stopper support unit is located in the blocking position; and an operation member to rotate the stopper support unit to the non-blocking position, wherein the stopper includes a first side interfering with the stopper support unit and pushing the stopper support unit to rotate to the non-blocking position when the operation panel is rotated from the storage position to the use position, and a second side interfering with the stopper support unit when the operation panel is rotated from the use position to the storage position.

2. The image forming apparatus of claim 1, wherein when the operation panel is in the use position, the stopper is blocked by the stopper support unit in the blocking position so that the operation panel is maintained in the use position.

3. The image forming apparatus of claim 1, wherein when the operation panel is in the use position, the second side is blocked by the stopper support unit so that the operation panel is maintained in the use position.

4. The image forming apparatus of claim 1, further comprising a rotation resistance unit to generate a rotation resistance force against a rotation of the operation panel.

5. The image forming apparatus of claim 1, wherein the operation panel is further moved from the storage position to a paper discharge position beyond the use position.

6. The image forming apparatus of claim 1, further comprising an ensconcing unit for accommodating the operation panel in the storage position.

7. The image forming apparatus of claim 1, wherein the main body comprises a printing unit printing images onto paper, a scanning unit reading images from a document, and a paper discharge unit discharging printed paper.

8. The image forming apparatus of claim 7, wherein the scanning unit is located above the printing unit, and the paper discharging unit is located between the printing unit and the scanning unit.

9. The image forming apparatus of claim 8, wherein a first space in the use position is higher than about 60 mm in length between a bottom of the operation panel and a loading side of the paper discharge unit.

10. The image forming apparatus of claim 9, wherein the operation panel is further moved to a paper discharge position forming a second space larger than the first space between the bottom of the operation panel and the loading side.

11. The image forming apparatus of claim 10, further comprising a rotation resistance unit to generate a rotation resistance force against a rotation of the operation panel.

12. The image forming apparatus of claim 11, wherein the operation panel is maintained in an arbitrary position between the use position and the paper discharge position by the rotation resistance force of the rotation resistance unit.

13. The image forming apparatus of claim 1, wherein the operation member comprises:

a press unit exposed to outside of the main body for a user to press;

an extension unit which extends toward a rotation member from the press unit; and a hook unit configured to be coupled to the main body to prevent separation of the operation member from the main body.

* * * * *